No. 701,864. Patented June 10, 1902.
A. T. FERRELL.
FEEDING DEVICE FOR BEAN SORTING MACHINES.
(Application filed May 24, 1901.)
(No Model.)
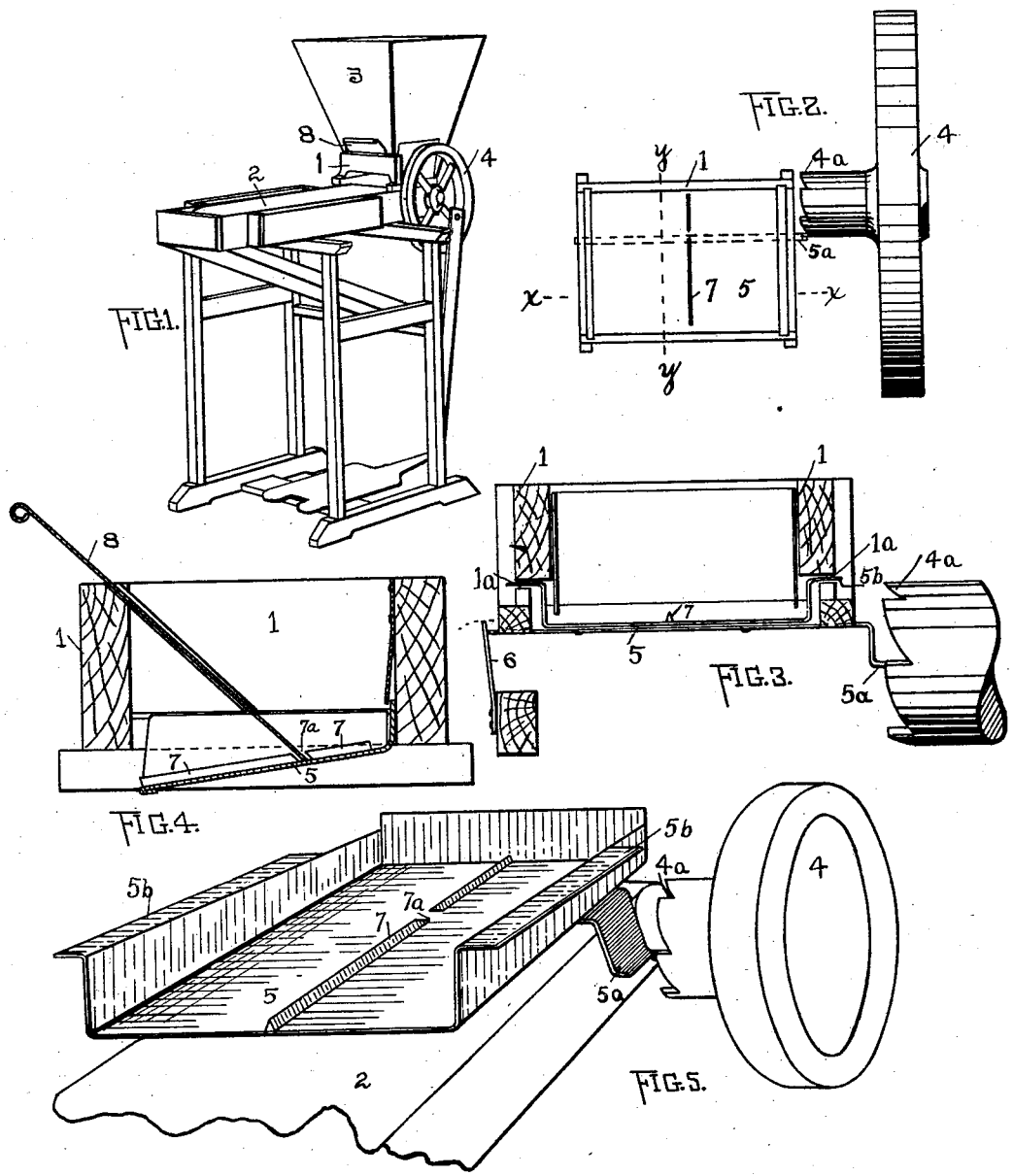
WITNESSES:
J. Gould
E. J. Warren.
A. T. Ferrell INVENTOR.
BY
Geo. B. Willcox ATTORNEY.
THE NORRIS PETERS CO., PHOTO-LITHO., WASHINGTON, D. C.

UNITED STATES PATENT OFFICE.

ALBERT T. FERRELL, OF SAGINAW, MICHIGAN.

FEEDING DEVICE FOR BEAN-SORTING MACHINES.

SPECIFICATION forming part of Letters Patent No. 701,864, dated June 10, 1902.

Application filed May 24, 1901. Serial No. 61,715. (No model.)

*To all whom it may concern:*

Be it known that I, ALBERT T. FERRELL, a citizen of the United States, residing at Saginaw, in the county of Saginaw and State of Michigan, have invented certain new and useful Improvements in Feeding Devices for Bean-Sorting Machines; and I do hereby declare the following to be a full, clear, and exact description of the invention, such as will enable others skilled in the art to which it appertains to make and use the same.

This invention is a device for feeding beans and like material from the hopper to the movable apron of a sorting-machine. It has for its object to provide a simple and inexpensive device that will automatically feed the beans in any quantity desired uniformly over the apron, where they can be sorted by hand, and to regulate the speed at which they are fed to the apron. I attain these objects by the means illustrated in the accompanying drawings, in which—

Figure 1 is a perspective view of a bean-sorting machine embodying my improvement. Fig. 2 is a plan view of the wheel and the vibrating plate. Fig. 3 is a vertical section on the line $xx$ of Fig. 2. Fig. 4 is a vertical section on the line $yy$ of Fig. 2. Fig. 5 is a detail showing the wheel, the vibrating plate, and part of the apron.

As is plainly shown in the drawings, the device consists in a rectangular box 1, mounted on the sorting-machine above the apron 2 and supporting the hopper 3, from which the beans are to be delivered. The fly-wheel 4, which is operated by a foot-treadle or other suitable means, has a projecting hub carrying ratchet-teeth $4^a$ on its inner face. Horizontally mounted in side slots $1^a$ of the box 1 is the laterally-vibrating plate 5, which receives the beans from the hopper 3 and delivers them to the apron. A downwardly-projecting arm $5^a$, the lower end of which is engaged by the teeth $4^a$, is fixed to the plate 5 and moves it away from the wheel as the arm $5^a$ overrides each tooth. As soon as the arm $5^a$ is released from the tooth a spring 6, yieldingly pressed against a projection on the opposite side of the plate, forces the plate back to its former position. The plate is thus rapidly vibrated and the beans are shaken along its inclined bottom until they drop upon the apron 2.

In order to prevent the beans from clogging, I provide one or more longitudinal flanges 7, that project above the plate 5. A sliding gate 8 extends from the front of the box diagonally toward the plate 5 and by raising or lowering it the rate of discharge is controlled. In order to feed smaller grain or seeds, if desired, I provide slots $7^a$ in the flanges 7, so that the gate can be partly closed against the plate 5 by passing through the slot $7^a$, thus not interfering with the vibration of the plate. I prefer to support the plate by flanges $5^b$, extending laterally and operating in the slots $1^a$ of the frame 1.

What I claim as my invention, and desire to secure by Letters Patent, is—

1. In a feeding device of the class described, a box located between the apron and the hopper and carrying a slidably-adjustable inclined gate; a reciprocating plate having a flange which is interrupted in its length to form a space for the lower edge of the inclined gate and having at its sides laterally-extending supporting-flanges; a wheel carrying ratchet-teeth; an arm or pawl attached to the plate and overriding the teeth; and a spring for holding the arm normally in contact with the teeth.

2. In a feeding device for sorting-machines, a reciprocating inclined feeding-plate having a flange which is interrupted in its length to form a space for the lower edge of the inclined gate, for the purpose set forth.

In testimony whereof I affix my signature in presence of two witnesses.

ALBERT T. FERRELL.

Witnesses:
  I. GOULD,
  WILLIAM STEPHENS.